Sept. 15, 1931.  E. H. TARTRAIS  1,823,770
ENGINE OF THE TWO-STROKE TYPE
Filed Nov. 26, 1929    6 Sheets-Sheet 1

INVENTOR:
Eugène Henri Tartrais
By Mauro & Lewis
attorneys

Sept. 15, 1931.  E. H. TARTRAIS  1,823,770
ENGINE OF THE TWO-STROKE TYPE
Filed Nov. 26, 1929  6 Sheets-Sheet 2

INVENTOR:
Eugene Henri Tartrais
By Mauro + Lewi
Attorneys

Sept. 15, 1931.  E. H. TARTRAIS  1,823,770
ENGINE OF THE TWO-STROKE TYPE
Filed Nov. 26, 1929     6 Sheets-Sheet 3
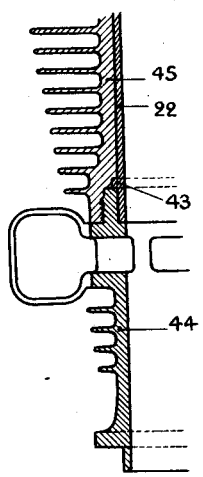
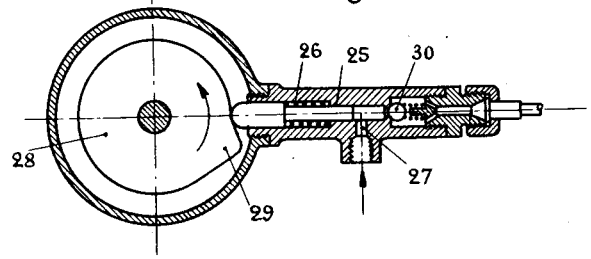
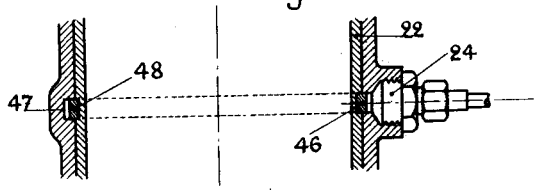
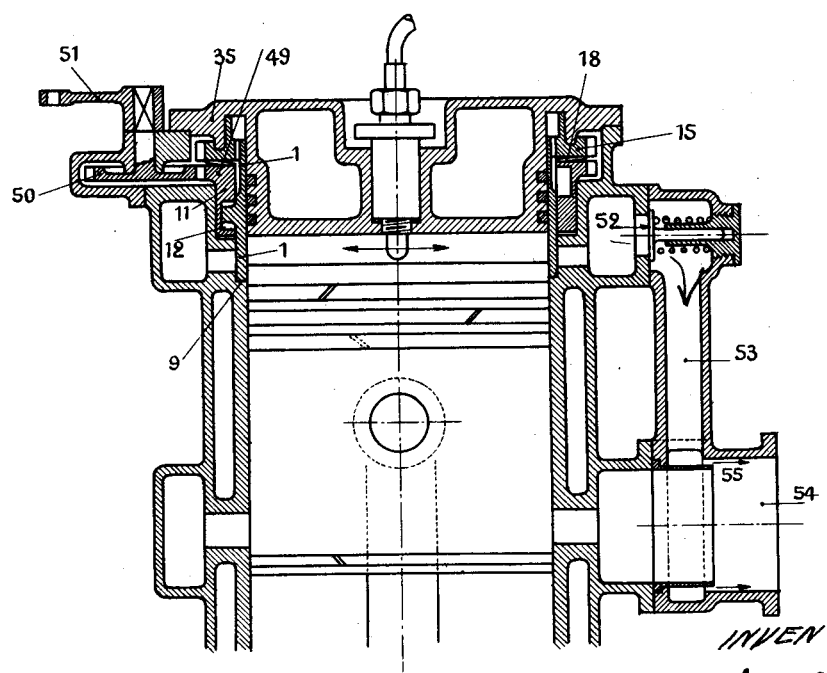

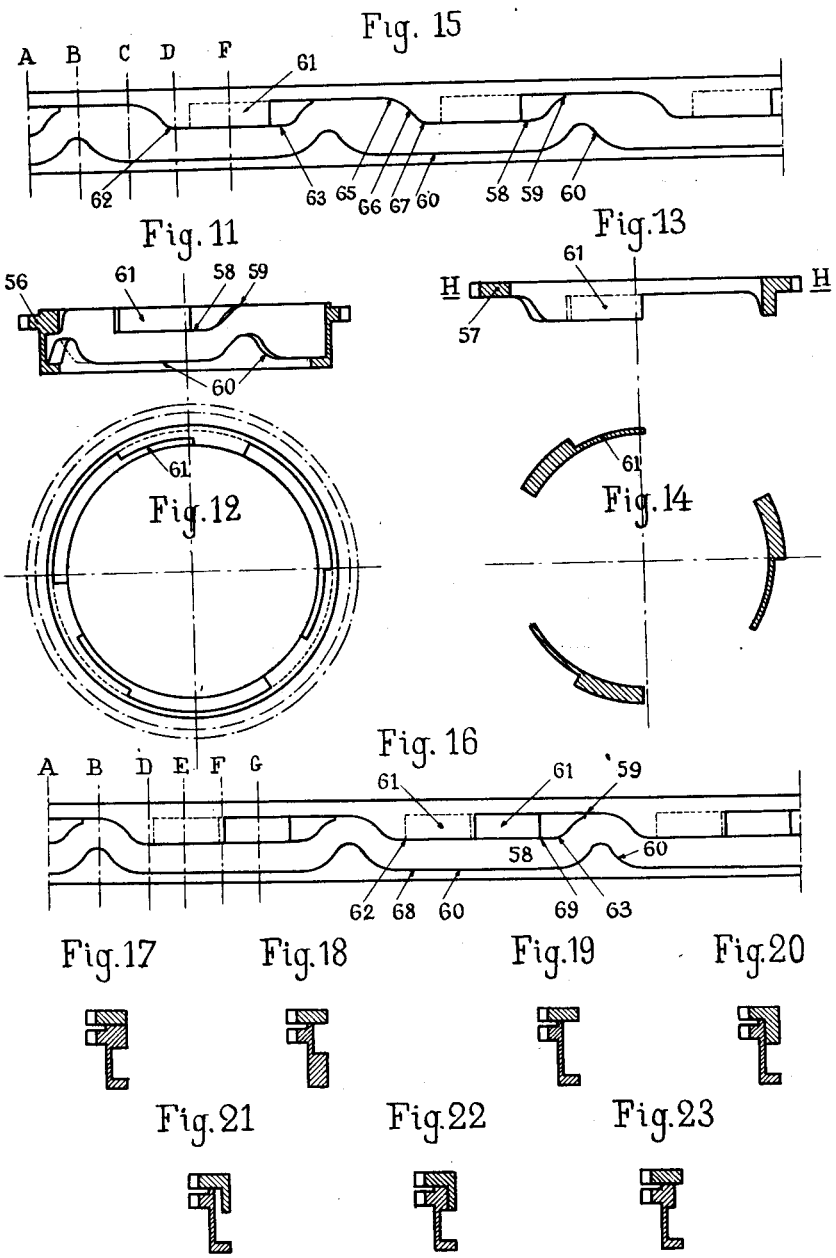

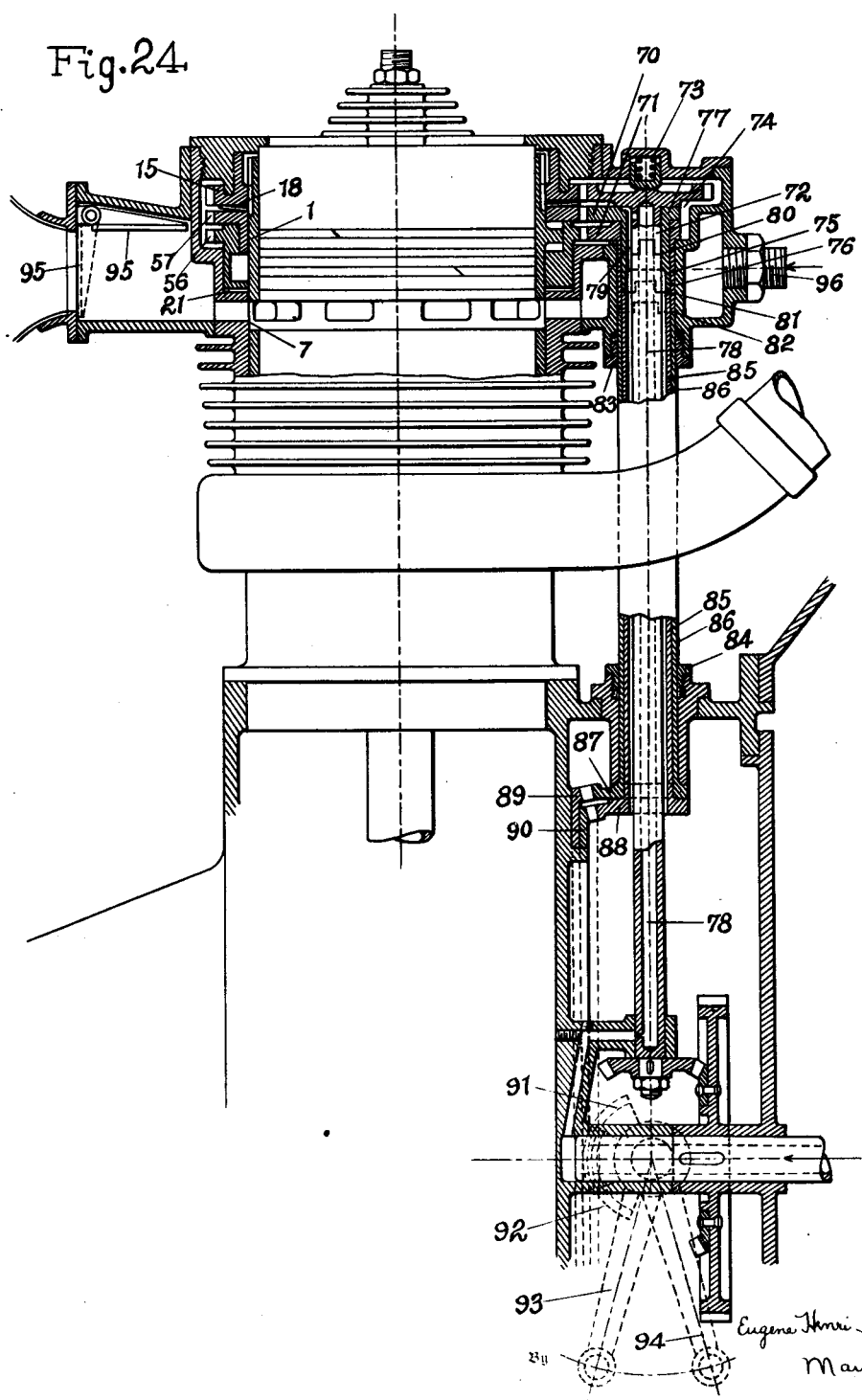

Sept. 15, 1931.  E. H. TARTRAIS  1,823,770
ENGINE OF THE TWO-STROKE TYPE
Filed Nov. 26, 1929   6 Sheets-Sheet 6

Inventor
Eugene Henri Tartrais
By Mauro + Lewis
Attorneys

Patented Sept. 15, 1931

1,823,770

UNITED STATES PATENT OFFICE

EUGÈNE HENRI TARTRAIS, OF MONTMORENCY, FRANCE

ENGINE OF THE TWO-STROKE TYPE

Application filed November 26, 1929, Serial No. 409,890, and in France November 26, 1928.

Cylindrical valves, chiefly employed for two-stroke engines, are already known, which possess an alternate rectilinear motion and act as fluid control valves, then returning upon a seating after the manner of an ordinary valve. However such devices are defective due to the fact that it is very difficult to provide leakless conditions for the seating.

The present invention relates to valve gears offering new and important advantages such as the use of an improved system of lubrication for the cylinder, the feasibility of regulating the valve gear as desired, also the elimination of the scavenging pump, and other advantages as will be further set forth.

The said system is chiefly characterized by the use of a combined slide valve and poppet valve, analogous to the aforesaid known valve but adapted not only for an alternate rectilinear motion, but also for rotation about its axis, that is, the axis of the cylinder, special means being provided for a reliable and abundant lubrication of the said valve and especially of its seating. This affords the following results: (1) the said seating is made leakless by the constant presence of this oil which is distributed by the rotation, and (2) the rotation maintains the seating in a well ground and clean condition. The lubricating means may vary provided the said desiderata are obtained, but a suitable means for lubrication which is particularly advantageous will be hereinafter described.

Fig. 7 shows in section a lubricating pump;

Figs. 8 and 9 are sectional views illustrating the fixation of an inner sleeve to the cylinder;

Fig. 10 is an axial section of another embodiment of the invention;

Figs. 11 and 13 are vertical sections of the two parts respectively of the cam;

Figs. 12 and 14 are a corresponding plan and a section respectively on the line H—H of Fig. 13;

Fig. 15 is a development of the cam made of the two parts shown in Figs. 11 to 14;

Fig. 16 is an analogous development of the cam in another relative position of the parts;

Figs. 17 to 23 are cross-sections taken along the lines A, B, C, D, E, F, G, respectively of Figs. 15 and 16;

Fig. 24 is an elevation partly in section of another embodiment of the invention;

Figure 1:
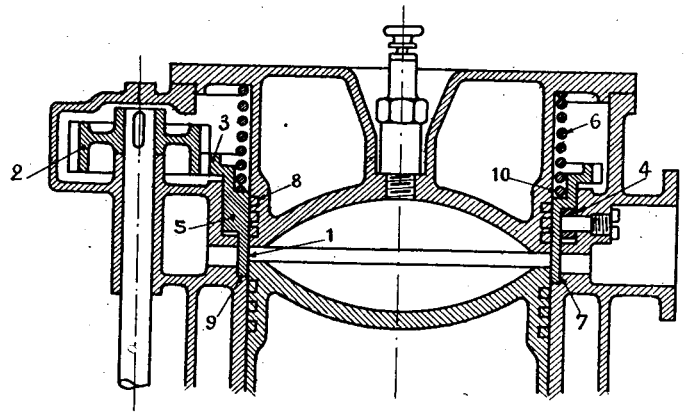
Fig. 1 is an axial section of a simplified embodiment of the invention.
Figure 2:
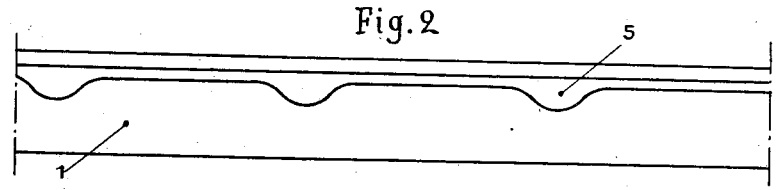
Fig. 2 is a diagram of the development of the cam.
Figure 3:
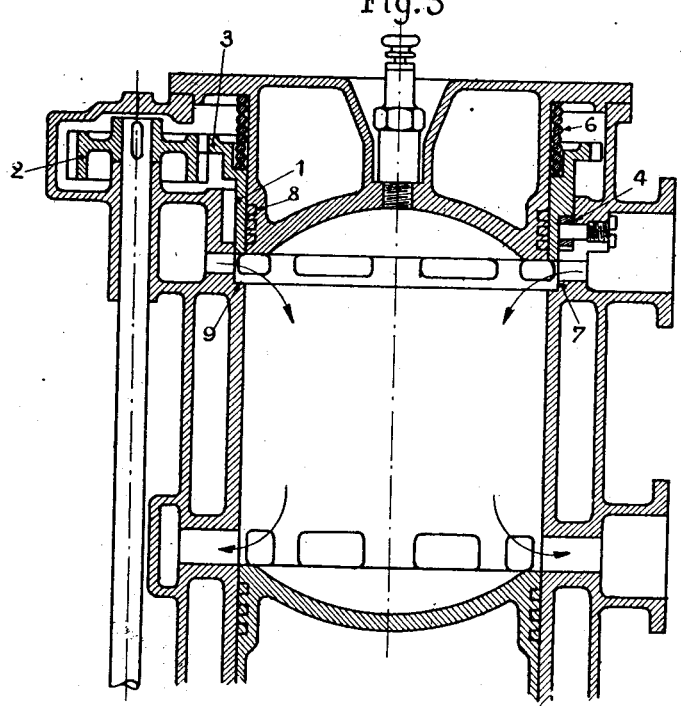
Fig. 3 is an axial section similar to Fig. 1 showing the slide valve in another position.

The invention will first be described in its simplest form, in order to show the fundamental principle. It is observed in Figure 1 that the slide-valve 1 consists of a cylindrical body whose internal wall preferably serves as an extension of the cylinder wall, and whose external wall is provided with a cam affording axial displacements. Figure 2 shows the external development of the slide valve and of the cam. The movement of rotation is produced by the gear 2 in mesh with toothed portion 3 of the valve. On the cylinder are mounted friction members or rollers 4 in the same number as the bosses 5 of the cam (Figures 1, 2 and 3). Figure 3 shows the valve in the raised position. The device comprises at least two rollers and bosses, but three are preferably employed, and in this event the valve rotates at one-third the engine speed. Obviously, all bosses and rollers have an identical disposition and an equidistant position, and thus at each ⅓ revolution of the valve, that is, at each revolution of the engine, and at the proper time, the valve which is actuated at three points will rise, thus compressing the spring 6, after which the spring returns the valve to its seat.

In Figure 3, the piston is at the lower part of its stroke and the valve is open; the scavenging thus takes place. The arrows show the path of the fluids, that is, the air and the residual gas.

The overlapping part 7 of the lower end of the valve is not obligatory, and the arrangement might be used without this overlap, for instance with a slow-speed engine; but for high-speed engines, for which the device is chiefly adapted, its advantage is obvious, since by this overlap the valve can actually be termed a slide valve; it operates in fact as a slide valve, that is, it opens and closes at full speed. It acts as an ordinary valve only as concerns leakless conditions at its lower part. In this description, the terms "upper, lower, up, down, rise, descend etc." refer solely to the figures. The upper part is made leakless by packings or rings 8.

No particular lubrication is shown in this first example. Figures 1 and 3 show the general case of an internal combustion engine with ignition by sparking plugs, and with scavenging by carburetted air. The oil is supposed to be introduced into the charge by one of the known methods, and this oil covers the walls of the collector and advances gradually towards the interior, entrained by the current of air. It is observed in Figure 3 that the valve necessarily stops this flow; at each stroke, the valve cuts through the layer of oil, and forces the oil upon the seating 9 which herein consists of a shoulder of the cylinder; as the valve continues its uniform rotation, it distributes the oil upon the whole periphery of the seating 9, while at the same time it expels oil which is taken up on the outside and forms part of the second layer. The oil which is expelled in the interior forms a round roll, and this is at once spread and taken up by the piston. When the valve again raises, the surface of the valve which has remained in the oiled condition will make contact with the upper guide 10 and the packing 8. This upper part is formed and assembled as in the case of the Knight valveless engines. The oil, which necessarily circulates through the packing 8, lubricates the cam, rollers and gearing, and if the device is leakless at the exterior, (as it should be) this oil will of course return to the valve.

It is thus evident, as stated, that an abundant oiling is provided for the valve and particularly for its seating, as all of the oil intended for the cylinder—which evidently requires more than the valve—must necessarily flow under the seating of the said valve. This arrangement is employed to produce a joint which could not otherwise be made tight except by the use of an excessive strength for the spring 6.

Obviously, the spring 6 may be given all necessary shapes, or it may be replaced by a plurality of springs which are individually guided and are equally spaced upon the periphery of the valve; and further, the said spring or springs may bear upon said valve through the medium of special members operating by friction or by rolling contact.

The aforesaid represents the simple and fundamental form of the apparatus, but it is subject to various changes in the way of improvements. Instead of disposing the cam upon the valve, it may be mounted on the cylinder, and in this case the valve carries the rollers. The valve is thus made lighter, and other very important considerations will result, as will be further specified. A lighter construction is also afforded by making the gearing 3 as a separate piece and by operating the valve by slidable keys. The cam disposed on the valve or on the cylinder, may comprise a double operative surface, thus affording a desmodromic control; but when the said cam is mounted on the cylinder, it is better adapted for replacing the spring 6 by another type of spring which acts only in the closing position, thus holding the valve upon its seating 9.

Figure 4:
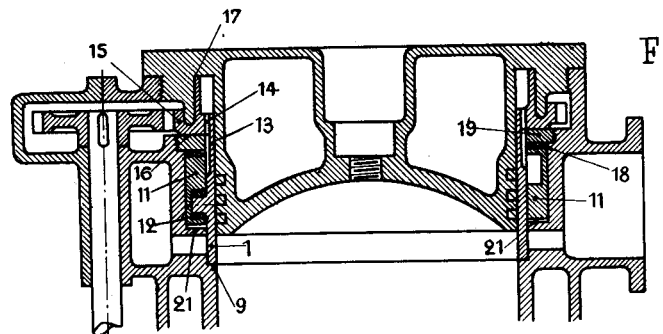
Fig. 4 is an axial section of another embodiment of the invention.
Figure 5:
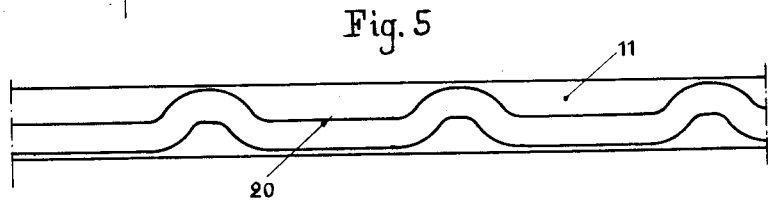
Fig. 5 is a diagram of the development of the cam shown in Fig. 4.

Figure 4 shows such modifications, indicating the double cam 11, whose developed form is shown in Figure 5. The said cam is held in the proper angular position, but in this position alone, by studs which are not shown. The valve 1 is provided with rollers 12 which can be mounted upon smooth journals cast in one with the valve. At the upper part of the valve are the keys 13, integrally cast, which are slidable axially in grooves 14 of the geared part 15 which is no longer axially displaced but is held by stops 16—17. A desmodromic control is employed, but a spring 18 in the form of a concave disk is disposed in such manner that it rests upon a fixed stop 19 screwed into the cylinder, and it urges the cam 11 downwardly, which cam is a compact and rigid piece and makes contact by the parts 20 (Figure 5) of its upper contact surface with the rollers 12 of the valve, thus urging the valve upon its seat 9 at three points. To carry this out, a very small play is allowed at 21, below the cam piece 11. When the valve begins to rise, or is about to begin, the valve will remain stationary for a moment, in the axial direction, and the cam piece again descends in order to make contact at its lower face, thus taking up the play 21, and in this manner the whole action will take place as if the spring 18 were not employed.

Figure 6:
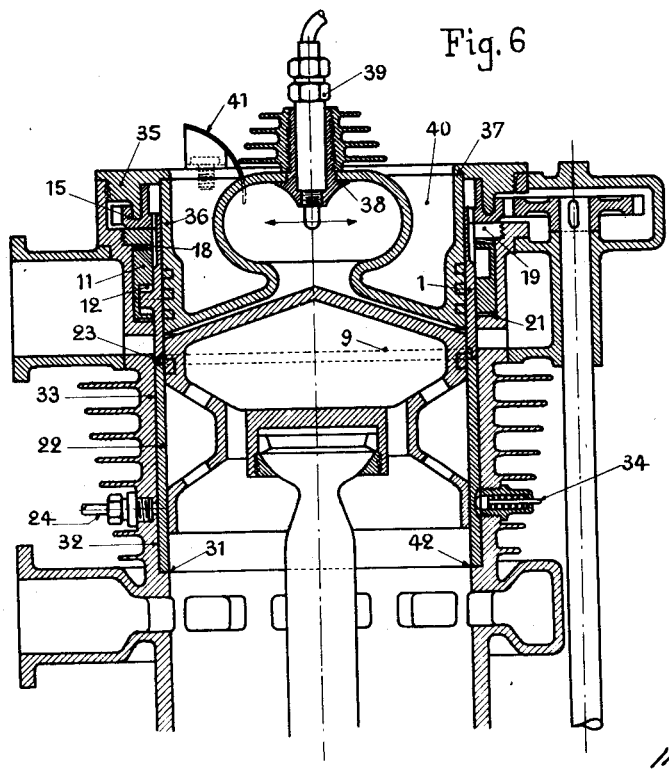
Fig. 6 is an axial section of another embodiment of the invention.

In the said device, the valve makes contact at 9 with a shoulder of the cylinder; but a certain play is necessary at the outer part of the valve, and also, the cylinder is subject to elliptical wear, so that if the piston is to cover the joint 9 when in motion, as above stated, a difficulty is found by reason of the fact that the valve and cylinder are not in exact coincidence, and hence it is preferable that the slide valve supporting part 9 of the cylinder should be formed, not by the cylinder itself, but by the upper face of a sleeve having the same thickness as the slide valve and consisting of the same metal, also having the same play, care being taken to avoid elliptical wear of said sleeve. The sleeve may even be fitted into the valve (as shown at 23 in Figure 6), and this fitting or joint may be almost without play, since the expansion of the two pieces is about the same. This device is shown in Figure 6, and in this connection, mention will be made of the lubricating arrangement which is particularly advantageous, as above stated.

Like numerals indicate similar parts, as shown in the preceding construction. Furthermore, the device comprises a sleeve 22, which is herein represented with a fitted joint 23 and is freely movable in the cylinder. The joint 23 consists, as shown in Fig. 6, of an annular flange on the lower part of the valve 1 and an annular groove in the upper part of the sleeve 22.

At 24 is observed a coupled pipe for the supply of oil under pressure from a pump shown in Figure 7, said pump operating as follows: When the piston 25 is at the bottom of its stroke, it being urged into this position (as shown) by the spring 26, the oil enters the main body of the pump through the orifice 27; this oil is either drawn in, or is discharged under pressure by the general oil pressure lubricating circulation employed for the other mechanisms. The cam 28 will for instance rotate at ten times the speed of the engine, and it is set at such an angle that when the boss 29 abruptly drives out the piston 25, thus sending the oil through the clock valve 30, the scavenging slide valve will be positively held closed. The seating 31 of the sleeve 22 on the cylinder thus closes off all circulation of oil to the lower part of the cylinder. For this reason, and also since the play at 32 may be made less than at 33, the oil supplied under pressure at 24 is almost entirely circulated to the slide valve. The continual afflux of the scavenging air prevents its return to the conduit of the same; it is expelled in the form of a thin sheet, which is absorbed by the mechanism already specified.

It should be noted that the sleeve 22 tends to be drawn by friction during the rotation of the slide valve at the times at which it is not covered by the piston; if all is in proper order, this should produce a slow revolution by which all elliptical wear of the sleeve is prevented. For like reasons, there is represented a piston which is rotatable due to a ball-and-socket joint at the end of the piston rod. Due to all these movements, the oil is well distributed. Obviously, the arrangement is completed by various means adapted to prevent the oil from rising from the crank-case into the cylinder.

Since the sleeve 22 is urged in rotation with but a very small force, the fact of its rotation implies that all is in perfect condition in the cylinder, and means should be provided for observing this fact. By way of example among the numerous means which may be provided, Figure 6 shows a small push-piece 34 cooperating with a recess in the sleeve; the recess thus moves the said piece at each revolution, and this can be used for observation, or for the control of a suitable signal.

The accessory use of the movement of rotation of the valve may also be applied to the cylinder head itself. As shown in Figure 6, the cylinder head is no longer made in one piece with the screw plug or cap 35, but it consists of two members 35—36. The joint 37 comprises no assembling means. However a suitable element (not shown) is provided in order to prevent the cylinder head from falling into the cylinder. During the operating period, the gas pressure strongly closes the joint 37, but during the scavenging period, there may be a time at which the system is almost entirely discharged, and the slide valve then draws with it the cylinder head by the friction of the packing or in any other manner. Figure 6 shows an engine of the injection type, operating by spontaneous ignition. The joint 38 of the seating of the fuel nozzle 39 is self-closed, and has a free action, and hence nothing prevents the free rotation of the cylinder head, while the said fuel nozzle remains stationary. Such rotation may be of use with an air-cooled engine, which is the case in the present example. The concave portion 40 is not open to the wind, and it is thus provided with a deflecting screen 41, and the unsymmetrical disposition of the apparatus is corrected by the rotation of the cylinder head.

It will be observed that the defect in the fitting which is avoided in the joint 9 by the use of the sleeve 22 is made evident below, at the joint 31 of the sleeve with the cylinder; but in addition to the fact that it is less manifest, for obvious reasons, the conditions may be improved by the use of rounded parts 42, which could not be employed with the joint 9.

Figure 6 shows a sleeve 22 which is freely mounted in the cylinder. Theoretically, it is not to be maintained in the axial direction, but it is advisable to so maintain the said sleeve, and this may be effected (Figure 8) by means of a rib 43, which can be readily provided if the cylinder consists of two parts. This is the case, for instance, with an air-cooled engine in which the lower part of the cylinder 44 is of steel and the upper part 45 of aluminium. Another means consists as shown in Figure 9 in providing in the sleeve a groove 46, coinciding with a deeper groove 47 in the cylinder, said grooves containing a split ring 48 of the type of the known piston packing ring, and the sleeve thus maintained has the advantage of being readily removed if the ring 48 can be entirely contained in the cylinder groove. For this purpose it is simply necessary to open the slot by a tool which is inserted through a suitable aperture in the cylinder.

The preceding considerations specified certain advantages obtained by the use of a cam which is disposed upon the cylinder, but other advantages are afforded. The cam need not be secured by pins, but it may be connected by suitable means with a suitable control by which the device can be set as desired.

Figure 10 shows such an arrangement, by way of example. The same reference numerals are employed. In addition the device comprises a gearing element 49, secured to the cam, and a gear wheel 50 under the control of a lever 51. As a modification, the spring 18 is no longer in contact with a stationary piece, but it rests upon the gearing 15 controlling the slide valve; said gearing makes contact with the plug 35 which is herein formed in one with the cylinder head. In this example the engine is water cooled; the control for the valve and for the supply of the scavenging air (not shown) are supposed to be situated in another sectional plane, in order to simplify the figure.

The cam may be more or less displaced in the direction of motion by the lever 51, thus relieving the compression of the engine and allowing it to start with facility. In fact, at the lower dead centre, the cylinder is filled with air through the exhaust orifices; this air is compressed when the piston returns, and it escapes into the scavenging conduit when the valve opens at its upper dead centre. This impeding arrangement is very powerful, and it can be regulated at will by the use of the lever 51. Such a device is chiefly applicable to motor vehicles. Obviously, the conduit for the scavenging is provided with a safety valve 52; an approved disposition consists in discharging it into the exhaust through a conduit such as 53, leading to the point 54, and so directed that the oil from the valve will be thrown with great force at 55 and will not tend to return to the cylinder, for in such event it would be contaminated with carbon.

The preceding dispositions relate to cases in which mechanical simplicity is the chief object.

A modified form of the cam will now be described, by which the adjustment of the point of opening of the valve and of its point of closing, can be separately effected, also showing that the technical advantages of this arrangement may in certain cases largely compensate for any slight complication.

The cam is now made in two parts, and the said cam is shown in detail in Figures 11 to 23.

Figure 24 shows the parts assembled and disposed in the cylinder, also representing suitable controlling means for the same, which means are chiefly applicable to aeroplane engines of the radial type.

It is observed in these various figures that the two parts of the cam comprise a respective gearing member 56—57. The lower portion comprises the lower cam surface 60 and a part (58—59) of the upper cam surface, or the one corresponding to the lift of the valve. The upper portion comprises the upper cam surface, less the aforesaid part. The two members are fitted into one another, and each may be turned about independently of the other, within the limits allowed by the guides 61, which guides afford the continuous travel of the rollers during the part of their path 62—63, which corresponds to the time during which the valve is upon its seating; but during a part of this movement, the rollers rest upon only one-half of the width of their contact surface (Figures 21—22—23). The spring 18 (Figure 24) is situated as in the preceding example. The control is still desmodromic as concerns the lift, save in the very small part 59 at the end (see the details) in which the angle is cut down. On the contrary, in the position shown in Figure 15 (development) the descent 65, 66, 67 is only half controlled, that is, in the part 65—66 corresponding to the accelerated motion. This is not necessarily exactly one-half, as in the figures, and it is possible to provide at the middle a portion having a uniform movement. In the part 66—67, the valve continues its motion in virtue of the acquired speed, and thus comes upon its seat with a certain shock.

This shock does not take place between the rollers and the cam, but between the valve and its seat, as the spring 18 now acts, and the cam is at this time in contact with the stop 21. The cam surface 68—69 (Figure 16) is thus situated in a lower plane than the one passing through the lower generatrices of the rollers. The shock is thus produced upon the seating, but without prejudice, for in the first place the surface of the seating is considerable with reference to the weight of the valve, and secondly, the shock takes place upon an oil cushion.

The outline of the cam may be such as to provide for a positive control as far as the point at which the valve reaches the level of the joint 7, which is the only important factor for the gas control.

The control of the angular position of the cams (Figure 24) is effected by the gearing elements 70 and 71, which may consist of two toothed sectors, as also the gearing elements 56 and 57 (which is herein the case for the first two). The gearing elements 70—71 are in the present construction secured to hollow rods 75—76 concentric with the control 72 of the valve. A spring 73 herein makes the whole device leakless, and prevents the oil which is situated at 74 and comes from the cylinder by leakage, as stated, from returning to the crankcase through the hollow rods 75—76

However the bushing 77 is lubricated with clean oil fed under pressure through the duct 78, and which is returned to the crankcase by escaping through the detent groove 79.

The different shafts 72—75—76 are sectioned at 80—81—82 for assembling purposes. At 83—84, that is upon a fixed part, are mounted stuffing boxes which readily prevent all loss of oil. The hollow rods 85—86, which are in line with the rods 75—76, are secured to toothed sectors of tapered shape 87—88 engaged with two respective gearing elements 89—90 whose axis coincides with the axis of the engine. At the side of the crank-case, these two gearing elements engage two toothed sectors 91—92, similar to 87—88, but externally connected to controlling levers 93—94, adapted to change at will the angular position of the annular members 89—90, and hence, by means of 87, 88, etc. . . the adjustment of the fluid control in all of the cylinders and in the same degree.

The fact that the said regulation can be carried out in a very convenient manner, affords particularly advantageous results, in the case of aeroplane engines, and chiefly as follows:—

For such uses, it is possible to employ long exhaust pipes, and to use one such pipe for each cylinder. However it is a well-known fact that in a two-stroke engine in which the free exhaust takes place through a long pipe, there is a certain speed at which the scavenging takes place by self-action, by the effect of inertia, but this takes place only at a single speed, since the air inlet must open at the exact time at which the optimum conditions prevail for this effect, and this time, considered from a mechanical point of view, varies to a great degree with the speed of the engine, also with the load, and with the pressures, temperatures and densities of the residual gases and the atmosphere. However, due to the aforesaid control, the air inlet can always be opened at the proper time, and it is closed when desired, this being an essential feature.

In the special case of an aeroplane engine, advantage may be taken of the pressure produced by the travel of the aeroplane, by disposing air inlets against the wind. Furthermore, if the exhaust pipes are sufficiently cooled by an internal air circulation, according to a known method, these may be disposed in the interior of the aeroplane body.

It should be observed that the aforesaid regulating arrangement is not exclusively employed to eliminate the scavenging pump, and it will prove useful even should this pump be employed, since it will reduce the work of said pump. Only the variation of the closing point is of interest, by offering, among its various features, a particular means for varying the load.

It is also feasible to employ solely for starting purposes, a scavenging pump which can then be uncoupled, or which is automatically uncoupled, and the said pump may serve at the same time as a starting device known per se. Herein the charge (or pressure) supplied by said pump or motor is delivered through a coupling device 96 (Figure 24) and the air supply nozzle for normal speed is closed by an automatic valve 95, which opens when the proper speed is obtained.

The term "free exhaust" herein employed as concerns the scavenging without pump, is not to be taken literally, and the result will be practically the same if all of the long exhaust pipes lead to a common muffler box having little resistance. If such a device is combined with a large scavenging pump, if a throttle valve is disposed at the outlet of the muffler box, and if said valve is operated to obtain a temporary increase of the weight of the charge (pressure) and hence of the couple, according to a known method, the said arrangement is advantageous due to the fact that when the valve is again fully opened, the scavenging pump which is normally of an excessive size will however be discharged.

Obviously, the invention is not limited to the use of the mechanical details herein represented, and it comprises all modifications which may be employed by a person skilled in the art and which are out of the limits of the present description. But it is understood that the descriptions relative to the several figures represent only examples of construction.

It is however of interest to chiefly mention the following detail modifications.

1. With reference to Figure 6, if the friction drive of the sleeve 22 and of the cylinder head 36 is not sufficient this may be effected in a positive manner by any suitable mechanical device adapted for continuous or intermittent action.

Figure 25:
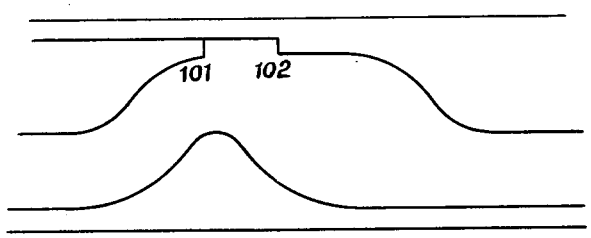
Fig. 25 illustrates the operation of the cam.

2. It is possible to avoid the elimination of the cam outline represented at 59 (Figures 11—15—16) by means of the arrangement shown in Figure 25, which is readily observed. The vacuum at 101—102 has no importance, since at this time the slide valve, which is axially urged only by its very small weight, is in fact held in place, in this direction, by the friction of the packing.

Figure 26:
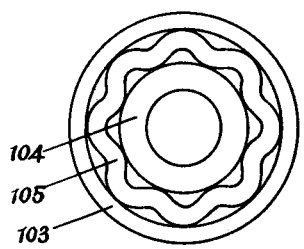
Figs. 26 and 27 show a detail.

3. Figure 26 shows a roller adapted to prevent shocks, which consists of a central core 104 and a ring 103, having between them a member 105 which is not readily deformable, due to its shape or its substance.

Figure 27:
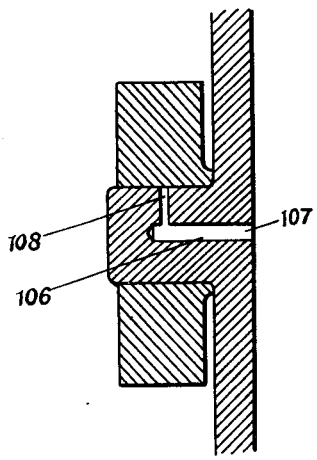

4. Figure 27, which is a partial section of the slide valve through the axis of a roller, shows a means for obtaining the lubrication of the journals under pressure, by means of the duct 106. According as the orifice 107 is situated below or above the packing, the oil is driven to 108 by the pressure of the gases or by centrifugal force alone. Obviously, all precautions are taken to prevent all leakage of gas or even a too rapid expulsion of the lubricant. For this purpose, the journal is adjusted in a very accurate manner; the hole 108 is very small, and is situated at the top, so that the roller will press upon it during the periods of fuel admission.

What I claim is:—

1. In an internal combustion engine of the two-stroke type, whose cylinders are provided with a row of exhaust ports which are uncovered by the piston at the end of its stroke, and with a row of ports for the admission of fresh fuel at the other end of the said cylinder, a cylindrical slide valve adapted to open and close the said admission ports by a sliding reciprocating motion, a cam having an outlined portion cooperating with rollers in order to effect the sliding motion of the said valve, abutment means cooperating with said valve in the closing position, and means for continuously rotating said slide valve on its axis.

2. In an internal combustion engine of the two-stroke type, whose cylinders are provided with a row of exhaust ports which are uncovered by the piston at the end of its stroke, and with a row of ports for the admission of fresh fuel at the other end of the said cylinder, a cylindrical slide valve adapted to open and close the said admission ports by a sliding reciprocating motion, a cam having a double outlined portion cooperating with rollers in order to effect the sliding motion of the said valve, a play being provided below the contact surface of the cam, a spring pressing upon said cam and means whereby the said valve is continuously rotated upon its axis.

3. In an internal combustion engine of the two-stroke type, whose cylinders are provided with a row of exhaust ports which are uncovered by the piston at the end of its stroke, and with a row of ports for the admission of fresh fuel at the other end of the said cylinder, a cylindrical slide valve adapted to open and close the said admission ports by sliding a reciprocating motion; a plurality of rollers disposed at the periphery of the slide valve; a double outlined portion of said cam which is adapted to receive and to guide the said rollers; a play being provided below the bottom of the said cam; a spring pressing upon said cam; and means whereby the said valve may be continuously rotated upon its axis.

4. In an internal combustion engine of the two-stroke type, whose cylinders are provided with a row of exhaust ports which are uncovered by the piston at the end of its stroke, and with a row of ports for the admission of fresh fuel at the other end of the said cylinder, a cylindrical slide valve adapted to open and close the said admission ports by a sliding reciprocating motion; a cam having an outlined portion cooperating with rollers in order to produce the sliding motion of the said valve, abutment means cooperating with said valve in the closing position, a toothed ring surrounding said valve, a pinion adapted to rotate the said ring, and slidable means imparting the rotation of said ring to said valve while permitting the sliding motion of said valve.

5. In an internal combustion engine of the two-stroke type, whose cylinders are provided with a row of exhaust ports which are uncovered by the piston at the end of the stroke and with a row of ports for the admission of fresh fuel at the other end of said cylinder, a cylindrical slide valve adapted to open and close the said admission ports by a sliding reciprocating motion, a plurality of rollers disposed on the periphery of said valve, a cam, a double outlined portion formed upon said cam and cooperating with said rollers, a play being allowed below the bottom surface of said cam, a spring adapted to bear upon said cam, a toothed ring surrounding said valve, a pinion adapted to rotate the said ring, and slidable keys connecting said valve to said ring whereby the ring is enabled to rotate the said valve while at the same time permitting the sliding motion of the said valve.

6. In an engine as claimed in claim 1, packing members disposed on the outer face of the cylinder head in coincidence with the internal face of the valve, for leakless operation.

7. A method for the lubrication of the slide valve specified in claim 1, which consists in mixing, with the charge admitted into the cylinder by the slide valve, oil which is in a state of fine suspension in said charge.

8. In an internal combustion engine of the two-stroke type, whose cylinders are provided with a row of exhaust ports which are uncovered by the piston at the end of its stroke, and with a row of ports for the admission of fresh fuel at the other end of said cylinder, a cylindrical slide valve adapted to open and close said admission ports by a sliding reciprocating motion, a cam having an outlined portion cooperating with rollers in order to produce the sliding motion of said valve, abutment means cooperating with said valve in the closing position, means for the continuous rotation of said valve on its axis, a shoulder on the internal wall of the engine cylinder at a certain distance from said valve, an annular sleeve situated upon said shoulder, an annular flange on the lower part of the valve, and a groove formed in the upper part of said sleeve and adapted to receive the said flange.

9. In an internal combustion engine of the two-stroke type, whose cylinders are provided with a row of exhaust ports which are uncovered by the piston at the end of its stroke, and with a row of ports for the admission of fresh fuel at the other end of said cylinder, a cylindrical slide adapted to open and close said admission ports by a sliding reciprocating motion, a cam having an outlined portion cooperating with rollers in order to produce the sliding motion of said valve, abutment means cooperating with said valve in the closing position, means for the continuous rotation of said valve on its axis, a shoulder on the internal wall of the engine cylinder at a certain distance below the said valve, an annular sleeve disposed upon said shoulder in the interior of said cylinder, an annular flange on the lower part of the valve, an annular groove formed in the upper part of said sleeve and adapted to receive the said flange, and means provided on the wall of the engine cylinder for the introduction of lubricant between said wall and the said sleeve.

10. In an internal combustion engine of the two-stroke type, whose cylinders are provided with a row of exhaust ports which are uncovered by the piston at the end of the stroke, and with a row of ports for the admission of fresh fuel at the other end of said cylinder, a cylindrical slide valve adapted to open and close said admission ports by a sliding reciprocating motion, a cam, an outlined portion of said cam cooperating with rollers and having the same outline repeated three times on its periphery, and means for imparting to the valve a continuous rotation on its axis which is equal to one-third of the speed of the engine.

11. In an internal combustion engine of the two-stroke type, whose cylinders are provided with a row of exhaust ports which are uncovered by the piston at the end of the stroke, and with a row of ports for the admission of fresh fuel at the other end of said cylinder, a cylindrical slide valve adapted to open and close said admission ports by a sliding motion, a cam having an outlined portion cooperating with rollers in order to produce the sliding motion of the valve, abutment means cooperating with said valve at the end of its stroke, means for the continuous rotation of the valve on its axis, a shoulder situated on the internal wall of the engine cylinder at a certain distance from said valve, an annular sleeve disposed upon said shoulder, an annular flange situated at the lower part of said valve, a groove formed in the upper part of said sleeve and adapted to receive the said flange, an orifice in the wall of said cylinder in coincidence with said annular sleeve, and a proportioning pump adapted to supply a suitable lubricant, through said orifice, between said wall and the said sleeve.

12. In an internal combustion engine of the two-stroke type, whose cylinders are provided with a row of exhaust ports which are uncovered by the piston at the end of the stroke, and with a row of ports for the admission of fresh fuel at the other end of said cylinder, a valve adapted to open and close the said admission ports by a sliding reciprocating motion, a cam having an outlined portion cooperating with rollers in order to produce the sliding motion of said valve, abutment means cooperating with the said valve in the closing position, means for the continuous rotation of the valve on its axis, a shoulder situated on the internal wall of the engine cylinder at a certain distance from said valve, an annular sleeve disposed on said shoulder, an annular flange at the lower part of said valve and a groove formed in the upper part of said sleeve and adapted to receive the said flange, means imparting the rotation of the valve to said sleeve, and means for controlling the rotation of said sleeve from the exterior of said cylinder.

13. In an internal combustion engine of the two-stroke type, whose cylinders are provided with a row of exhaust ports which are uncovered by the piston at the end of the stroke, and with a row of ports for the admission of fresh fuel at the other end of said cylinder, a cylindrical valve adapted to open and close the said admission ports by a sliding reciprocating motion, a cam having an outlined portion cooperating with rollers in order to produce the sliding motion of the said valve, means for maintaining said valve in the closing position, means for the continuous rotation of said valve on its axis, and means whereby the rotation of said valve is imparted to the cylinder head.

14. In an internal combustion engine of the two-stroke type, whose cylinders are provided with a row of exhaust ports which are uncovered by the piston at the end of the stroke, and with a row of ports for the admission of fresh fuel at the other end of the said cylinder, a valve adapted to open and close the said admission ports by a sliding reciprocating motion, a cam having an outlined portion cooperating with rollers in order to produce the sliding motion of the said valve, abutment means for maintaining the said valve when in the closing position, means operated from the exterior of the cylinder for regulating the angular position of said cam, and means for imparting a movement of rotation to the said valve upon its axis.

15. In an internal combustion engine of the two-stroke type, whose cylinders are provided with a row of exhaust ports which are uncovered by the piston at the end of the stroke, and with a row of ports for the admission of fresh fuel at the other end of said cylinder, a cylindrical valve adapted to open and close the said admission ports by a sliding reciprocating motion, a cam having an outlined portion cooperating with rollers in order to produce the sliding motion of the said valve, means for maintaining the said valve in the closing position, a toothed portion on the periphery of said cam, a toothed sector cooperating with said toothed portion and adapted for control from the exterior of said cylinder whereby the angular position of said cam can be varied, and means for imparting a movement of rotation to the said valve upon ts axis.

16. In an internal combustion engine of the two-stroke type, whose cylinders are provided with a row of exhaust ports which are uncovered by the piston at the end of the stroke, and with a row of ports for the admission of fresh fuel at the other end of said cylinder, a cylindrical valve adapted to open and close the said admission ports by a sliding reciprocating motion, a cam composed of two superposed members whose combnation forms a double race cooperating with rollers and thus effecting the sliding motion of the said valve, means for regulating the angular position of said members, each independently, and means for imparting a movement of rotation to the said valve upon its axis.

17. In an internal combustion engine of the two-stroke type, whose cylinders are provided with a row of exhaust ports which are uncovered by the piston at the end of the stroke, and with a row of ports for the admission of fresh fuel at the other end of said cylinder, a cylindrical valve adapted to open and close the said admission ports by a sliding reciprocating motion, a cam composed of two superposed members whose combination forms a race, cooperating with rollers in order to effect the sliding motion of the said valve, a toothed portion on the periphery of each of the said members, a respective toothed sector cooperating with each toothed portion, and means adapted for external control in order to produce the rotation of said sectors, each independently of the other.

18. In an internal combustion engine of the two-stroke type, whose cylinders are provided with a row of exhaust ports which are uncovered by the piston at the end of the stroke, and with a row of ports for the admission of fresh fuel at the other end of said cylinder, said cylinders having the radial disposition, a cylindrical slide valve mounted upon each cylinder and adapted to open and close the said admission ports by a sliding reciprocating motion, a cam having an outlined portion cooperating with rollers in order to effect the sliding motion of said valve, abutment means cooperating with said valve in the closing position, a toothed ring rotating the said valve, a pinion cooperating with said ring, first a shaft carrying said pinion, a bevel pinion concentric with the engine shaft and adapted to rotate the first-mentioned shaft of each engine cylinder, a toothed portion formed on the periphery of each cam, a toothed sector cooperating therewith, a shaft carrying the said sector and concentric with the first-mentioned shaft, a pinion mounted at the end of said concentric shaft and a second pinion concentric with the engine shaft, engaging the said pinion; and adapted for external control.

19. In an engine as claimed in claim 1, an exhaust pipe of great length adapted to effect the automatic scavenging of the engine cylinders by inertia, at a certain speed of the engine.

In testimony whereof I have signed this specification.

EUGÉNE HENRI TARTRAIS.